US009262487B2

(12) United States Patent
Youssef et al.

(10) Patent No.: US 9,262,487 B2
(45) Date of Patent: Feb. 16, 2016

(54) METHOD AND APPARATUS FOR GUIDED ACQUISITION AND TRACKING IN GLOBAL NAVIGATION SATELLITE SYSTEM RECEIVERS

(71) Applicant: Samsung Electronics Co., Ltd., Gyeonggi-do (KR)

(72) Inventors: Mohamed Youssef, Marion, IA (US); Andi Jakupi, Marion, IA (US); Bruce McCullough, Robins, IA (US); Steven Gronemeyer, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 73 days.

(21) Appl. No.: 14/071,242

(22) Filed: Nov. 4, 2013

(65) Prior Publication Data

US 2015/0032371 A1    Jan. 29, 2015

Related U.S. Application Data

(60) Provisional application No. 61/858,281, filed on Jul. 25, 2013.

(51) Int. Cl.
| | |
|---|---|
| *G01C 21/00* | (2006.01) |
| *G06F 17/30* | (2006.01) |
| *G01C 21/20* | (2006.01) |
| *G01S 19/06* | (2010.01) |
| *G01S 19/28* | (2010.01) |
| *G01S 19/34* | (2010.01) |

(52) U.S. Cl.
CPC .......... *G06F 17/30545* (2013.01); *G01C 21/20* (2013.01); *G01S 19/06* (2013.01); *G01S 19/28* (2013.01); *G01S 19/34* (2013.01)

(58) Field of Classification Search
CPC combination set(s) only.
See application file for complete search history.

(56) References Cited

U.S. PATENT DOCUMENTS

| 5,408,237 | A | * | 4/1995 | Patterson | ............... H01Q 1/288 342/354 |
| 5,587,715 | A | * | 12/1996 | Lewis | ..................... G01S 19/07 342/357.24 |
| 5,736,959 | A | * | 4/1998 | Patterson | ............... H01Q 1/242 342/354 |
| 6,147,644 | A | * | 11/2000 | Castles | ............. H04B 7/18547 342/357.55 |
| 6,157,621 | A | * | 12/2000 | Brown | .................. H01Q 1/242 370/310 |
| 6,157,896 | A | * | 12/2000 | Castles | .................... G01S 19/14 342/357.68 |
| 6,580,390 | B1 | * | 6/2003 | Hay | ........................ G01S 19/05 342/357.31 |
| 6,647,340 | B1 | * | 11/2003 | Pemble | .................... G01S 19/08 340/992 |
| 7,825,855 | B1 | * | 11/2010 | Nicholson | ............... G01S 19/05 342/357.43 |
| 8,120,528 | B2 | * | 2/2012 | Tessier | ............... H04B 7/18554 342/357.48 |
| 2003/0050008 | A1 | * | 3/2003 | Patterson | ........... H04B 7/18578 455/12.1 |
| 2007/0021121 | A1 | * | 1/2007 | Lane | ..................... G01S 5/0009 455/441 |

(Continued)

OTHER PUBLICATIONS

Wang, Lei et al., Gnss Shadow Matching: Improving Urban Positioning Accuracy . . . , Navigation: Journal of the Institute of Navigation, vol. 60, No. 3, Fall 2013, pp. 195-207.

(Continued)

*Primary Examiner* — Jonathan L Sample
(74) *Attorney, Agent, or Firm* — The Farrell Law Firm, P.C.

(57) ABSTRACT

Methods, systems, and apparatuses for a portable device capable of receiving satellite navigational system signals to retrieve visibility mask information corresponding to the portable device's current location and/or trajectory are described.

16 Claims, 10 Drawing Sheets

(56) References Cited

U.S. PATENT DOCUMENTS

| | | | | |
|---|---|---|---|---|
| 2007/0171124 A1* | 7/2007 | Weill | .................... | G01S 19/42 342/450 |
| 2008/0129598 A1* | 6/2008 | Godefroy | .............. | G01S 5/0252 342/450 |
| 2009/0284411 A1* | 11/2009 | Tessier | ............... | H04B 7/18554 342/357.48 |
| 2010/0079332 A1* | 4/2010 | Garin | .................... | G01S 19/08 342/357.64 |
| 2011/0057833 A1* | 3/2011 | France | .................... | G01S 19/32 342/357.25 |
| 2011/0068977 A1* | 3/2011 | Thomson | ................ | G01S 19/06 342/357.43 |
| 2012/0059578 A1* | 3/2012 | Venkatraman | ......... | G01C 21/20 701/411 |
| 2012/0229332 A1* | 9/2012 | Vollath | .................... | G01S 19/23 342/357.25 |
| 2013/0013187 A1* | 1/2013 | Garin | .................... | G01S 19/08 701/409 |
| 2013/0169474 A1* | 7/2013 | White | .................... | G01S 19/28 342/357.23 |
| 2014/0266885 A1* | 9/2014 | Raghupathy | ......... | H04W 56/00 342/357.63 |

OTHER PUBLICATIONS

Liu, Jie et al., Energy Efficient GPS Sensing with Cloud Offloading, SenSys '12, Nov. 6-9, 2012, Toronto, ON, Canada, Copyright 2012 ACM, pp. 14.

Paek, Jeongyeup et al., Energy-Efficient Rate-Adaptive Gps-based Positioning for . . . , MobiSys '10, Jun. 15-18, 2010, San Francisco, California, Copyright 2010 ACM, pp. 14.

Peyraud, Sebastien et al., About Non-Line-Of-Sight Satellite Detection and Exclusion in a 3D Map-Aided Localization Algorithm, Sensors 2013, 13, 829-847.

\* cited by examiner

METHOD AND APPARATUS FOR GUIDED ACQUISITION AND TRACKING IN GLOBAL NAVIGATION SATELLITE SYSTEM RECEIVERS

PRIORITY

This application claims priority under 35 U.S.C. §119(e) to U.S. Provisional Patent Application Ser. No. 61/858,281 filed on Jul. 25, 2013, the entire disclosure of which is incorporated herein by reference.

BACKGROUND OF THE INVENTION

1. Field of the Invention

The present invention relates generally to reducing power consumption in a portable device capable of receiving Global Navigation Satellite System (GNSS) signals, and more particularly, to minimizing signal acquisition time and the number of required tracking channels in a portable device having a GNSS receiver using information regarding the portable device's current location.

2. Description of the Related Art

Satellite navigational systems provide positional and timing information to earth-bound receivers. Each system has its own constellation of satellites orbiting the Earth, and, in order to calculate its position, a receiver on Earth uses the satellites "in view" (i.e., in the sky above) from that system's constellation. Global Navigational Satellite System (GNSS) is often used as the generic term for such a system, even though such navigational satellite systems include regional and augmented systems—i.e., systems that are not truly "global." The term "GNSS," as used herein, covers any type of navigational satellite system, global, regional, augmented or otherwise, unless expressly indicated otherwise.

The number of GNSS systems, both planned and presently operational, is growing. The widely-known, widely-used, and truly global Global Positioning System (GPS) of the United States has been joined by one other global system, Russia's GLObalnaya NAvigatsionnaya Sputnikovaya Sistema (GLONASS), and is presently being joined by Europe's Galileo and China's BeiDou (also known, in its second generation, as COMPASS) systems—each of which has, or will have, its own constellation of satellites orbiting the globe. Regional systems (those that are not global, but intended to cover only a certain region of the globe) include Japan's Quasi-Zenith Satellite System (QZSS) and the Indian Regional Navigational Satellite System (IRNSS) currently being developed. Augmented systems are normally regional as well, and "augment" existing GNSS systems with, e.g., messages from ground-based stations and/or additional navigational aids. These include the Wide Area Augmentation System (WAAS), European Geostationary Navigation Overlay Service (EGNOS), Multi-functional Satellite Augmentation System (MSAS), and GPS Aided Geo Augmented Navigation (GAGAN). Regional GNSS systems, such as QZSS, can also operate as augmented systems.

Moreover, GNSS capabilities are no longer limited to any particular type of system or device. A GNSS receiver may be implemented in a mobile terminal, a tablet computer, a camera, a portable music player, and a myriad of other portable and/or mobile personal consumer devices, as well as integrated into larger devices and/or systems, such as the electronics of a vehicle. The term "GNSS receiver" as used herein, covers any such implementation of GNSS capabilities in a device or system.

Broadly speaking, the reception/processing of GNSS signals involves three phases: acquisition, tracking, and positional calculation (or "navigation solution"). Acquisition is the acquiring or identifying of the current satellites in view (SVs), which means satellites that are "visible" overhead, i.e., the satellites from which the GNSS receiver can receive signals. Obviously, in any "global" GNSS constellation of satellites, roughly half of the satellites are orbiting on the other side of the planet at any time. Acquisition uses one or more of satellite almanac information, the GNSS receiver's last positional calculation, assistive information concerning the local region received by terrestrial transmission, signal processing (specifically, finding satellite signals by correlating known signal patterns), and other means well-known by those of ordinary skill in the art, in order to acquire the current SVs. Acquisition can be understood as "finding" the SVs, tracking is the fine tuning of the signals received from the acquired SVs and the keeping track of the acquired SVs over time. Once acquired and adequately tracked, the SV's signals are processed to extract the navigational, positional, timing, and other data transmitted in each SV's signal, and the data from all the SV's being tracked is then used to calculate the GNSS receiver's position. Of course, there are further complexities to the actual reception and processing of GNSS signals, such as various loops feeding back information between these phases for further correction and adjustment of data, as is known to one of ordinary skill in the art.

When a GNSS receiver is implemented in a portable and/or mobile device which relies upon one or more batteries for power, the components used for GNSS signal reception, signal processing, and positional calculation use a substantial amount of the power budget when in use. When the GNSS capability is being used for continuous updating of positional information, such as when navigating a route in a moving vehicle or while walking in unfamiliar terrain, it is a particularly large drain on the one or more batteries.

More specifically, when in an environment where the "view" of the GNSS receiver is completely blocked for large regions of the sky, large amounts of battery power are wasted both in attempting to acquire SVs which can never be acquired and tracking SVs which can no longer be tracked.

The waste is not trivial, as every milliamp (mA) decreases the battery life of a portable device. Such battery power consumption spent on tasks which, by definition, can never succeed is a significant waste. Thus, there is a need for a system, method, and/or apparatus to reduce the power consumed in acquiring and/or tracking SVs blocked by local environmental conditions from a GNSS receiver in a portable device powered by one or more batteries.

SUMMARY OF THE INVENTION

The present invention addresses at least the problems and disadvantages described above and provides at least the advantages described below. According to one aspect of the invention, a GNSS receiver minimizes GNSS signal acquisition time and the number of tracking channels using mask information from a database.

According to one aspect of the present invention, a method for a portable device capable of receiving satellite navigational system signals to receive visibility mask information is provided, including retrieving mask information corresponding to a current location of the portable device; and setting a visibility mask based on the retrieved mask information corresponding to the current location of the portable device.

According to another aspect of the present invention, a portable device is provided, including a receiver configured to receive at least satellite navigational system signals; one or more processors; and at least one non-transitory computer-readable medium having program instructions recorded thereon, the program instructions configured to have the one or more processors perform the steps of retrieving mask information corresponding to a current location of the portable device; and setting a visibility mask for the satellite navigational system signals based on the retrieved mask information corresponding to the current location of the portable device.

According to yet another aspect of the present invention, a mobile terminal is provided, including a receiver configured to receive at least satellite navigational system signals; a mobile telecommunication network transceiver configured to transmit and receive signals of a mobile telecommunications network; one or more processors; and at least one non-transitory computer-readable medium having program instructions recorded thereon, the program instructions configured to have the one or more processors perform the steps of transmitting a request for mask information via the mobile telecommunications network to a mask database server, the request including information indicating the current location of the mobile terminal; receiving, in response, the mask information from the mask database server; and setting a visibility mask for the satellite navigational system signals based on the received mask information corresponding to the current location of the mobile terminal.

According to still another aspect of the present invention, a mask database server is provided, including one or more processors; and at least one non-transitory computer-readable medium having program instructions recorded thereon, the program instructions configured to have the one or more processors perform the steps of receiving requests from portable devices regarding mask information corresponding to specific locations; retrieving mask information corresponding to the specific locations from one or more mask databases; and transmitting mask information corresponding to specific locations to the requesting portable devices.

According to another embodiment of the present invention, a system for providing mask information to portable devices capable of receiving satellite navigational system signals is provided, including one or more mask database servers configured to store mask information according to a corresponding area; a plurality of portable devices connected to at least one mobile telecommunication network, each of the plurality of portable device configured to receive and transmit data to and from the one or more mask database servers via the at least one mobile telecommunication network, each of the plurality of portable devices including at least one non-transitory computer-readable medium having program instructions stored therein, the program instructions configured to have the one or more processors perform the steps of transmitting a request for mask information via the mobile telecommunications network to at least one of the one or more mask database servers, the request including information indicating a current location of a portable device; receiving, in response, mask information corresponding to an area including the current location from the at least one mask database server; and setting a visibility mask for the satellite navigational system signals based on the received mask information corresponding to the current location of the portable device.

BRIEF DESCRIPTION OF THE DRAWINGS

The above and other aspects, features and advantages of embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will be described in detail below with reference to the accompanying drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

In general, the present invention relates to improving the power consumption/saving for any portable device having a GNSS receiver/processing capability by reducing the expenditure of GNSS resources on SVs blocked by local environmental conditions. In embodiments of the present invention, information concerning local environmental conditions causing SV signal blockage are extracted, learned, and/or otherwise stored over time. Such information may be directly derived by, e.g., recognition of blocking structures and/or terrain from 3 Dimensional (3D) Maps or LiDAR (Laser-based Radar) and extracting data therefrom, and/or indirectly derived by, e.g., storing data from one or more users traversing a particular region over time and finding, for example, that no SVs are ever acquired/tracked in one or more sections of the sky (i.e., "learning"). Such information may be stored in one or more databases, locally and/or networked, and used by one or more portable devices to reduce acquisition and/or tracking activity relative to regions of the sky which are known to be or likely to be blocked from view.

In embodiments of the present invention, information concerning one or more visibility masks is the primary means for reducing acquisition and/or tracking power consumption relative to regions of the sky which are known to be or likely to be blocked from view. A visibility mask is a means for "masking" portions of the sky in terms of GNSS functions—i.e., even if other information indicates that an SV is located in a masked portion of the sky, the GNSS receiver will not try to, inter alia, acquire and/or track its signal. Many GNSS receivers automatically use a 10° visibility mask to prevent the acquisition and tracking of SVs estimated to be within 10° of the horizon because that portion of sky is usually blocked from view by terrain, man-made objects, etc. Visibility masks will be discussed in more detail in reference to FIGS. 3A-3F according to embodiments of the present invention.

Figure 1:
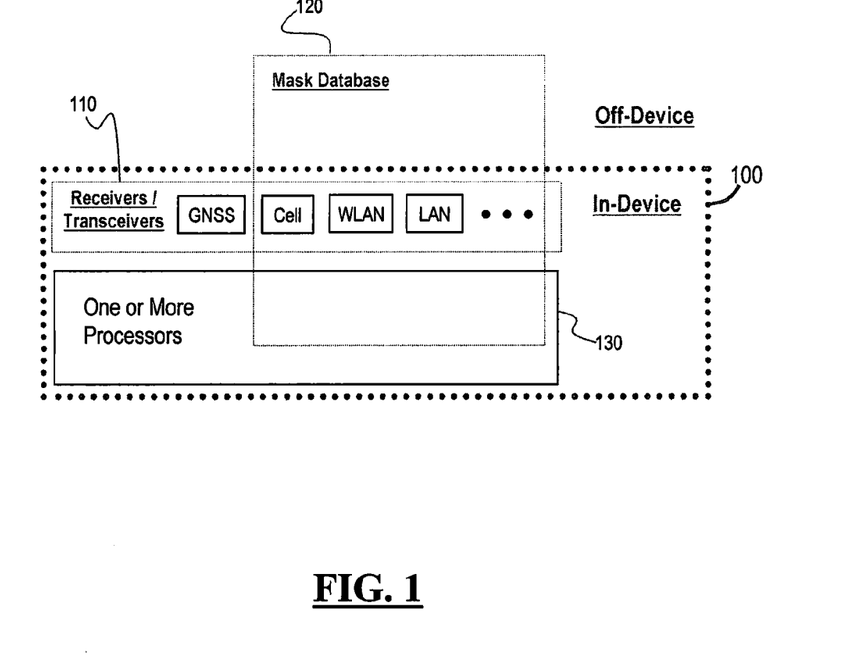
FIG. 1 is a diagram of a portable device 100 according to an embodiment of the present invention.

FIG. 1 is a diagram of a portable device 100 according to an embodiment of the present invention. Portable device 100 could be any of, e.g., a mobile terminal, a camera, a multimedia player, a notepad computer, a laptop computer, a portable navigational tool, or a navigational tool which can be removably plugged into or otherwise integrated into a type of moving vehicle, such as, for example, an automobile. Portable device 100 is represented by a shaded and dotted-line box, labeled "In Device," to indicate that the Mask Database 120 functionality according to the present invention may have parts in portable device 100 and parts outside of portable device 100, as will be discussed in further detail below.

Portable device 100 has a plurality of receivers and transceivers 110, including a GNSS receiver, a mobile/cellular telecommunications system transceiver (Cell), and a Wireless Local Area Network (WLAN) transceiver, such as, e.g., an IEEE 802.11 or Bluetooth transceiver, and wired Local Area Network (LAN) functionality, such as, e.g., IEEE 802.3 (Ethernet). These receivers/transceivers 110 may have separate and/or shared components, such as antennae and reception chains. The three solid dots in the receiver/transceiver 110 box indicate here, and elsewhere in this application, that more receivers/transceivers may exist in portable device 100.

Portable device 100 also has one or more processors 130. As is well-known to one of ordinary skill in the art, the number of processors would depend on the specific portable device in which the present invention is being implemented. For example, a mobile terminal may have less, and more- or less-specialized, processors than a laptop computer, and thus some of the functions described herein in relation to one or more processors 130 may be further distributed among various processors in a laptop computer than in a mobile terminal. As another example, depending on the embodiment, components such as receivers/transceivers 110 may have independent hardware controllers (which constitute processors) which perform functions for direct control of one or more components, while one or more separate processors perform most of the analysis and processing discussed herein in reference to embodiments of the present invention.

According to an embodiment of the present invention, portable device 100 also has Mask Database module 120, which is shown in FIG. 1 as both overlapping one or more processors 130 and extending outside portable device 100. The overlap with one or more processors 140 indicates that portions of Mask Database module 120 may be in the form of program instructions that are executed on the one or more processors 130. While other components in portable device 100 may also be in the form of program instructions executed on one or more processors 130, the fact that such components may or may not be executed on one or more processors 130 is peripheral to the description of embodiments of the present invention, as one of ordinary skill in the art would know.

Mask Database module 120 controls and implements access to, and analysis and storage of, mask information according to embodiments of the present invention. As discussed in further detail in reference to specific embodiments below, such mask information may include, without limitation, whole and/or partial visibility masks appropriate for a GNSS receiver located at a specific position and/or moving in a specific region in a specific direction, data from one or more GNSS receivers concerning the likelihood of acquiring/tracking SVs when located at a specific position and/or moving in a specific region in a specific direction, and/or data derived from one or more sources (such as mapping data, survey data, topographical data, etc.) concerning the regions of sky likely blocked from a GNSS receiver located at a specific position and/or moving in a specific region in a specific direction. Depending on the specific embodiment, Mask Database module 120 will access, store, analyze, or otherwise use mask information stored on at least one of portable device 100, a connectable data storage unit, a local Mask Database service, and/or a network Mask Database service.

Mask information stored in portable device 100 may be downloaded from and/or updated by connecting over a network with a central Mask Database service. In some embodiments, portable device 100 may store only the most immediately needed Mask Database information, and almost all Mask Database information originates from, and is stored by, a Mask Database service which transmits information to portable device 100 over a mobile telecommunications network. Such embodiments would have multiple central Mask Database servers and possibly intermediate and local servers for caching some of the Mask Database information. In other embodiments, a local Mask Database service may be provided, for example, as a standalone service and/or as a local augment to one or more mapping, navigational, and/or GNSS services.

Mask Database module 120 may log data concerning the acquisition and/or tracking of SVs when portable device 100 is located at a specific position and/or moving in a specific region in a specific direction. Such data may include information identifying one or more regions of the sky where SVs are hardly ever found. Any raw acquisition/tracking data received and/or generated by portable device 100 may be processed and/or otherwise modified by one or more processors 130 before being stored by Mask Database module 120. The storage and analysis of any logged data depends on the specific implementation of the embodiment of the present invention. For example, in one embodiment, portable device 100 stores and primarily uses data it has collected itself, thereby providing a Mask Database profile of ever-increasing accuracy (albeit narrow usage). The Mask Database profile may be stored in portable device 100, in a connectable and portable data storage unit, and/or a connectable but mostly immobile data storage unit at a location frequently visited by the user of portable device 100. For example, a user's Mask Database profile may be stored on a storage unit in a user's home and logged data is either continually transmitted to it via the Internet and/or a mobile telecommunications network or periodically uploaded, i.e., whenever portable device 100 can connect via the user's home WLAN to the storage unit.

In other embodiments, Mask Database module 120 may upload logged data to one or more databases as part of a regional and/or network service shared amongst many users. In such embodiments, data concerning the acquisition and/or tracking of SVs when portable device 100 is located at a specific position and/or moving in a specific region in a specific direction is aggregated from many portable devices, and then mask information based on such data is provided to any portable device located in that specific position and/or moving in that specific region in the same specific direction. As would be understood by one of ordinary skill in the art, although hardware is necessarily involved with the functions described in reference to Mask Database module 120, any of those functions may be performed by software, hardware, or a combination of the two, and those functions may be merged together and/or further separated out (by dividing a function into subfunctions), depending on the specific implementation of portable device 100 according to embodiments of the present invention.

Figure 2A:
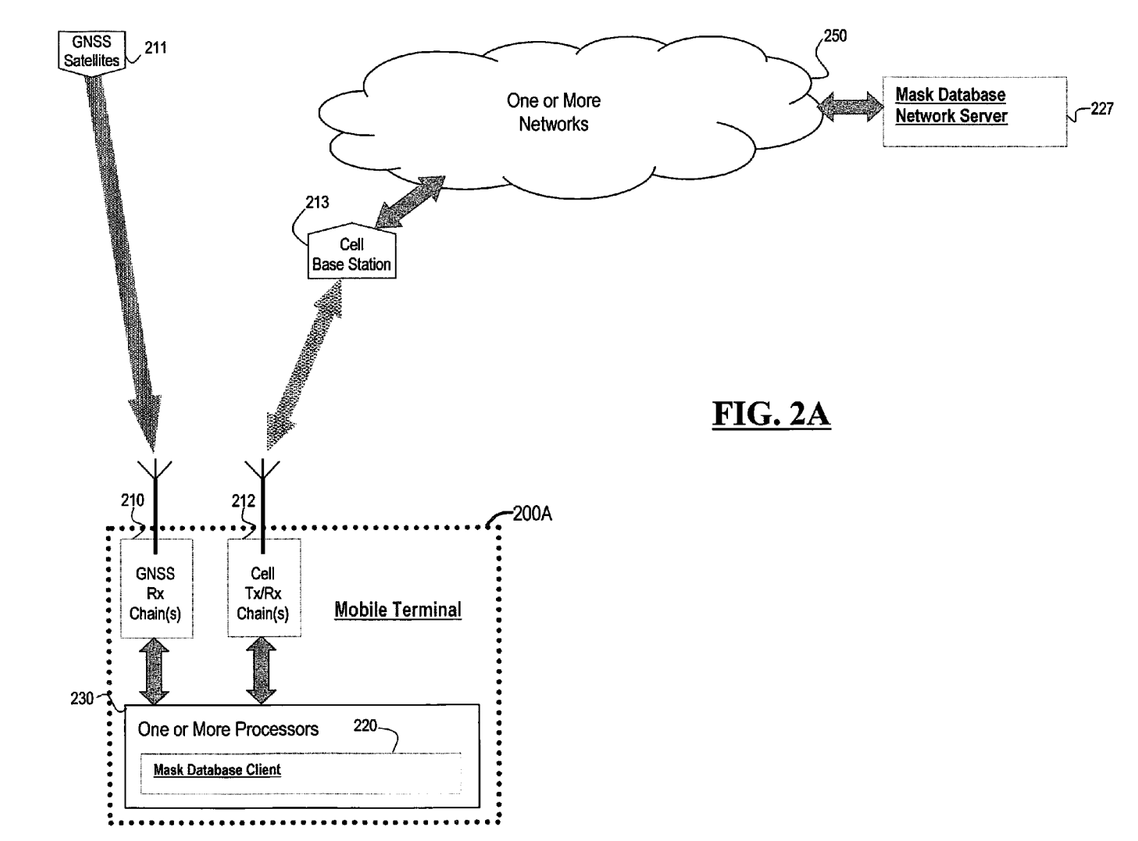
FIG. 2A is a diagram of a mobile terminal 200A which uses a network-based mask database according to an embodiment of the present invention.
Figure 2B:
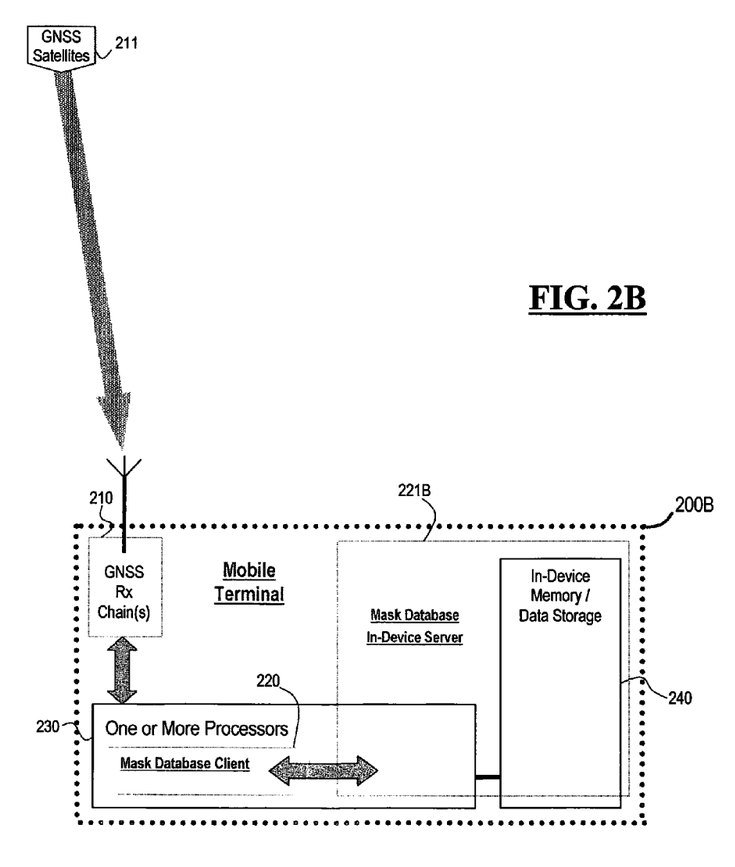
FIG. 2B is a diagram of a mobile terminal 200B which stores its own mask database according to an embodiment of the present invention.
Figure 2C:
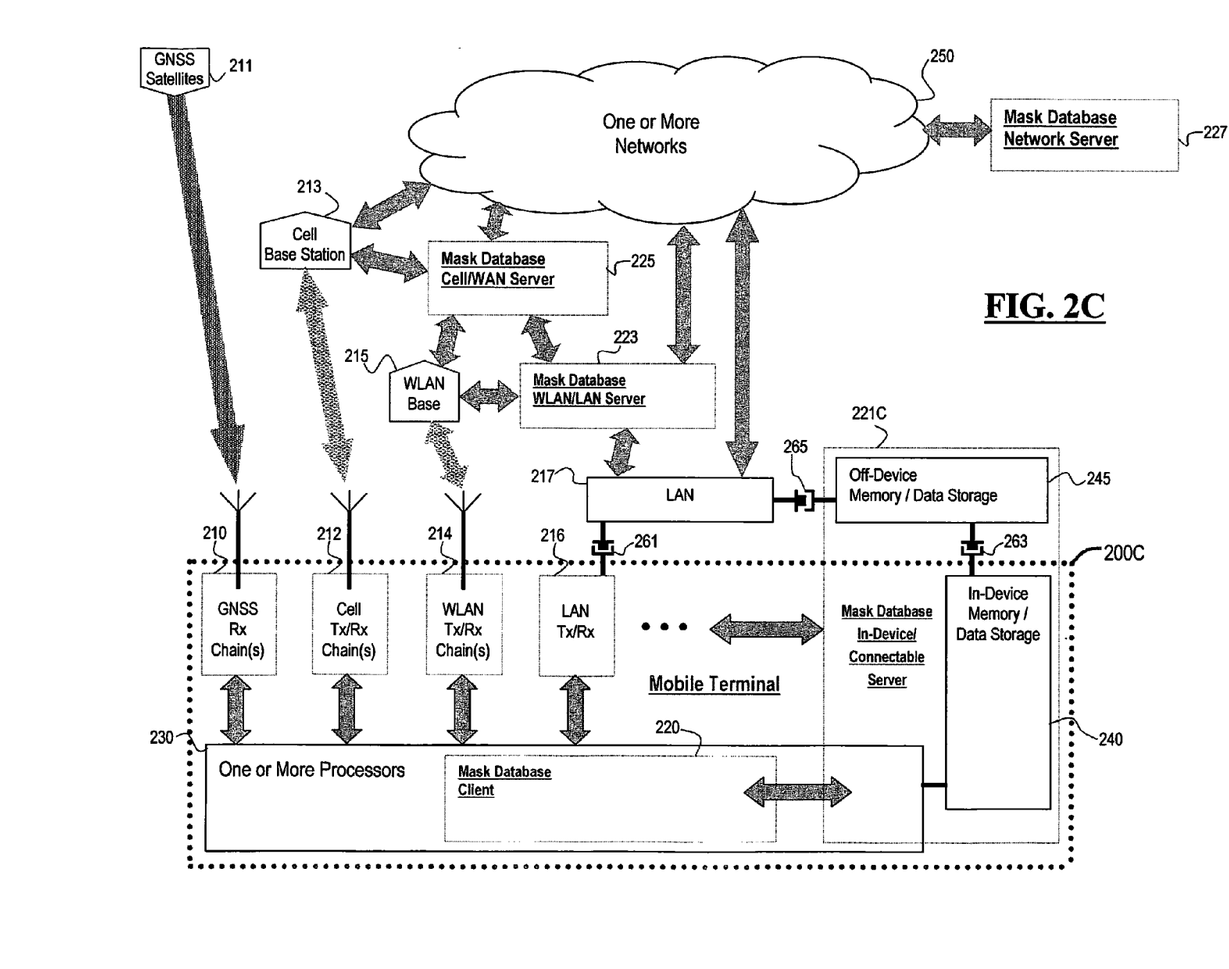
FIG. 2C is a diagram of a mobile terminal 200C and various possible mask databases and communication links according to an embodiment of the present invention.

FIGS. 2A-2C demonstrate the range of possible implementations of a mobile terminal according to embodiments of the present invention. Like portable device 100, the mobile terminal could be any of, e.g., a mobile terminal (such as a cellular telephone), a camera, multimedia player, a notepad computer, a laptop, a portable navigational tool, or any personal consumer electronic device having GNSS capability. In FIG. 2A, a network-based system of one or more databases provide the mobile terminal with mask information for its current location and/or present course of travel via a mobile telecommunications network. In FIG. 2B, the mobile terminal stores and uses mask information for its current location and/or present course of travel stored on its on-board memory. FIG. 2C illustrates many of the possible storage locations for mask information and possible communication links for uploading and downloading data from and to the mobile terminal according to embodiments of the present invention. In each of the embodiments shown in FIGS. 2A-2C, data from the mobile terminal concerning, inter alia, the relative success of acquisition and/or tracking at different locations and/or courses of travel is stored in order to update mask information for those different locations and/or courses of travel.

FIG. 2A is a diagram of a mobile terminal 200A with a network-based mask database according to an embodiment of the present invention. Although it may have more, only two communication means are shown in FIG. 2A for mobile terminal 200A: GNSS receiver 210 and mobile/cellular telecommunications system transceiver 212. GNSS receiver 210 receives signals from a plurality of GNSS satellites 211 of one or more GNSS system constellations, which may include, e.g., GPS, Galileo, GLONASS, and/or BeiDou. Cell transceiver 212 receives and transmits signals to one or more local base stations 213 using one or more mobile telecommunications standards, such as, e.g., the various Long Term Evolution (LTE) telecommunication standards promulgated by the 3$^{rd}$ Generation Partnership Project (3GPP). These receivers/transceivers 210/212 may have separate antennae and reception chains, and may share an antenna and one or more components for the reception and/or processing of signals.

Cell base station 213 is connected with one or more networks 250, which, in this embodiment, includes the Internet, and, through one or more networks 250, cell base station 213 is connected with Mask Database Network Server 227. Through these connections, mobile terminal 200A can upload and download data from Mask Database Network Server 227 via the mobile telecommunication network of which cell base station 213 is a part.

Mobile terminal 200A has one or more processors 230. As discussed above, the number, type, location, etc., of processors would depend on the specific implementation of mobile terminal 200A, whether the mobile terminal is a cellular telephone or notepad computer, etc. As shown in FIG. 2A, one or more processors 230 have one or more uni- and/or bidirectional communication links with, inter alia, GNSS receiver 210 and mobile/cellular telecommunications system transceiver 212.

The one or more processors 230 in mobile terminal 200A have Mask Database Client 220 running on it. Mask Database Client 220 requests, via cell base station 213, mask information from Mask Database Network Server 227, where such mask information regards mobile terminal 200A's current location and/or present course of travel in a specific region in a specific direction. Mask Database Client 200 also uploads data concerning, inter alia, the relative success of acquisition and/or tracking at different locations and/or courses of travel, to Mask Database Network Server 227. Mask Database Network Server 227 will use such data uploaded from mobile terminal 200A and other portable devices to continually update and refine mask information for specific locations and/or courses of travel. Although Mask Database Network Server 227 is shown as a singular entity in FIG. 2A, in most embodiments, the functions of Mask Database Network Server 227 would be distributed among a plurality of software and/or hardware components directly connected and/or connected by one or more private and/or public networks. For example, the processing of portable device requests and the provisioning of mask information to requesting portable devices would be performed by one or more network servers, whereas the reception and processing of acquisition/tracking data uploaded from portable devices would be implemented by different network servers, and the storage of mask information and uploaded acquisition/tracking data would be handled by database servers and database server farms and/or some other form of "cloud" storage.

In FIG. 2A, all of the mask information and tracking/acquisition data is downloaded from and uploaded to Mask Database Network Server 227 via a mobile telecommunications network. In this manner, many portable devices can share and use the mask information. By contrast, mobile terminal 200B in FIG. 2B stores and uses its own mask information and tracking/acquisition data.

In FIG. 2B, mobile terminal 200B has In-Device Memory/Data Storage 240, which may comprise one or more of Random Access Memory (RAM), Read-Only Memory (ROM), flash memory, a disk drive, and any other storage means known to those of ordinary skill in the art for storing data on a mobile terminal. Besides being comprised of different types of data storage, In-Device Memory/Data Storage 240 may be distributed amongst a plurality of memories/data storages in mobile terminal 200B. Mask Database Client 220 and at least a portion of Mask Database In-Device Server 221B run on the processors 230 in mobile terminal. Similar to Mask Database Network Server 227, Mask Database In-Device Server 221B provides mask information for mobile terminal 200's current location and/or present course of travel and stores/indexes of data concerning, inter alia, the relative success of acquisition and/or tracking at mobile terminal 200's current location and/or present course of travel. As with FIG. 2B, Mask Database Client 220 controls, directs, or otherwise implements the logging of data concerning, inter alia, the relative success of acquisition and/or tracking in mobile terminal 200's current location and/or present course of travel. The logged data, subsequently stored via Mask Database In-Device Server 221B, is used to adapt/modify mask information over time.

FIG. 2C illustrates many of the possible storage locations for mask information and possible communication links for uploading and downloading data from and to the mobile terminal according to embodiments of the present invention, including both Mask Database Network Server 227 of FIG. 2A and a modified form of Mask Database In-Device Server 221B of FIG. 2B.

Mobile terminal 200C has WLAN transceiver 214 and LAN module 216 in addition to GNSS receiver 210 and mobile/cellular telecommunications system transceiver 212. WLAN transceiver 214 receives and transmits signals to one or more WLAN base stations 215, using one or more of the IEEE 802.11 standards. LAN module 216 receives and transmits signals when connected to LAN 217, which may use a LAN standard, such as IEEE 802.3. Mobile terminal 200C may also have other means of communication and/or data input/output than those shown in FIG. 2C.

Mobile terminal 200C has two physical connectors 261 and 263. Connector 261 is for connecting with LAN 217. Connector 263 provides a more or less direct route for the download and upload of data from and to In-Device Memory/Data Storage 240. Connector 263 may provide a detachable connection with, e.g., a desktop computer, and/or an Off-Device Memory/Data Storage 245 as shown in FIG. 2C, which may comprise any type of portable memory. In embodiments utilizing such a connection, acquisition/tracking data stored on In-Device Memory/Data Storage 240 may be uploaded onto Off-Device Memory/Data Storage 245, and mask information stored on Off-Device Memory/Data Storage 245 may be downloaded to In-Device Memory/Data Storage 240. In some embodiments, Off-Device Memory/Data Storage 245 may remain connected to mobile terminal 200C to provide substantially real-time access and storage for mobile terminal 200C. In embodiments where Off-Device Memory/Data Storage 245 is used merely for data transfer, Off-Device Memory/Data Storage 245 is detachably connectable, via connector 265, to LAN 217, a desktop computer, and/or some other data source. Those data sources, in turn, either comprise a Mask Database or provide a connection to one or more Mask Databases. In FIG. 2C, for example, LAN 217 provides a connection to Mask Database WLAN/LAN Server 223 and/or Mask Database Network Server 227 via one or more networks 250. In some embodiments, LAN connector 261 is used to connect mobile terminal 200C directly to LAN 217, thereby providing a connection to Mask Database WLAN/LAN Server 223 and/or Mask Database Network Server 227 for uploading and/or downloading data.

Mask Database Client 220 and at least a portion of Mark Database In-Device/Connectable Server 221C are running on the processors 230 in mobile terminal 200C. Similar to FIG. 2B, Mask Database In-Device/Connectable Server 221C provides mask information and stores acquisition/tracking data, but Mask Database In-Device/Connectable Server 221C may also download mask information and/or upload tracking/acquisition data from and to other Mask Databases. Thus, In-Device/Connectable Server 221C in FIG. 2C may be provided with mask information periodically updated by one or more external Mask Databases, and/or may periodically provide acquisition/tracking data to one or more external Mask Databases. In some embodiments, In-Device/Connectable Server 221C may operate essentially as a local cache while data is substantially continuously provided by one or more external Mask Databases via, for example, the mobile telecommunications network.

FIG. 2C illustrates various possible Mask Database Servers and various possible communication links in a system including them and mobile terminal 200C. The Mask Database Servers include, from the largest to the smallest coverage area, Mask Database Network Server 227, Mask Database Cell/WAN Server 225, Mask Database WLAN/LAN Server 223, and Mask Database In-Device/Connectable Server 221C. In a distributed embodiment of the present invention, some or all of these types of Mask Database Servers would be used for the continual analysis, uploading, downloading, storage, and caching of data. For example, in one embodiment, Mask Database Cell/WAN Server 225 may work with, or be comprised of, a network of Mask Database WLAN/LAN Servers 223. In embodiments where the mobile telecommunications network provides the service, the Mask Database Server may comprise a network of Mask Database Cell/WAN Servers 225. In other embodiments, mobile terminal 200C may only download mask information from Mask Database Cell/WAN Server 225 through the mobile telecommunications network, while acquisition/tracking data concerning specific locations and/or specific courses of travel are uploaded to Mask Database WLAN/LAN Servers 223 and subsequently transmitted to and stored by Mask Database Network Server 227, which performs the analysis required for providing updated mask information to Mask Database Cell/WAN Server 225. Like the Database Servers, the communication links in FIG. 2C illustrate the various possibilities, and embodiments of the present invention may use, one, some, or all of the links in FIG. 2C.

Figure 3A:
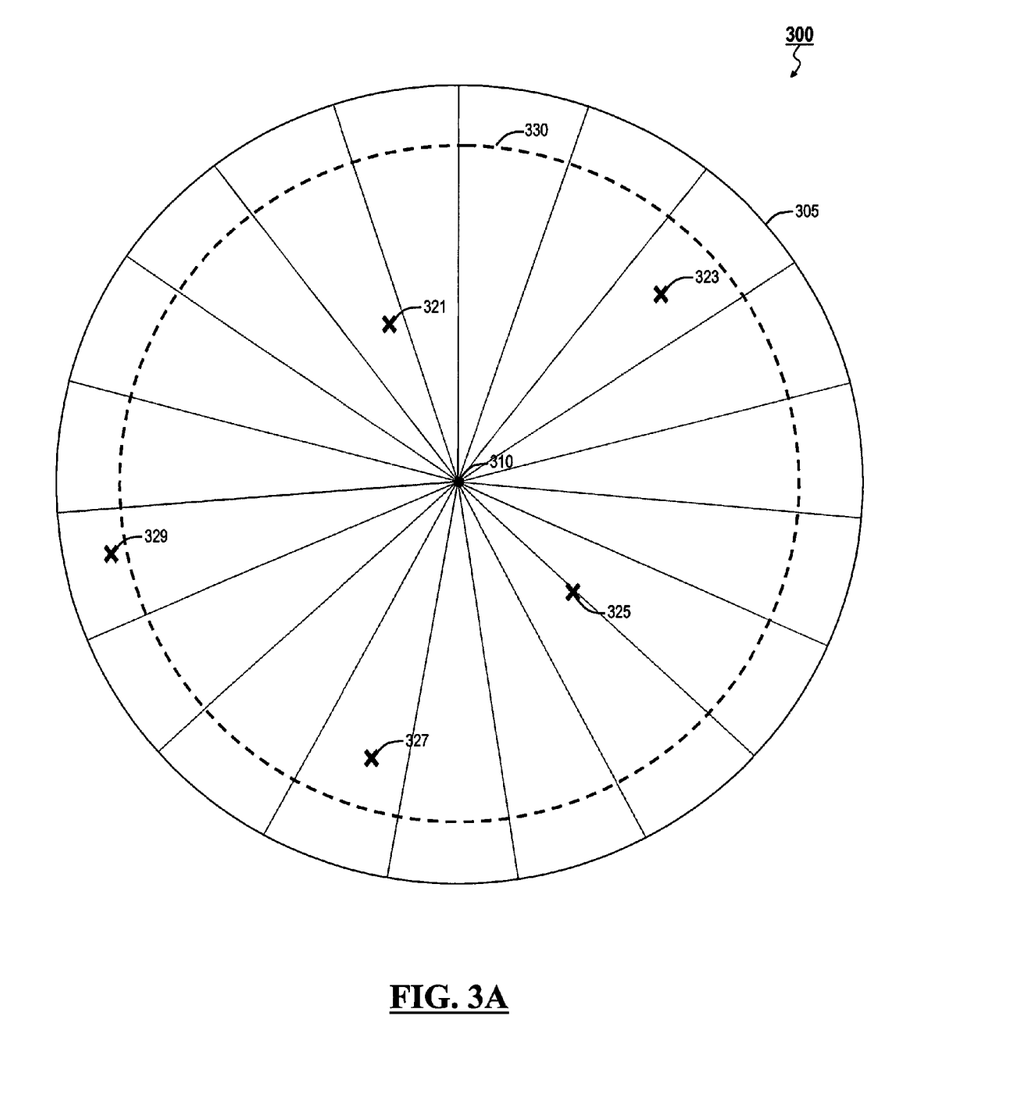
FIGS. 3A-3F illustrate various visibility masks according to embodiments of the present invention.

FIGS. 3A-3F illustrate various visibility masks according to embodiments of the present invention. More specifically, FIGS. 3A-3F are planar representations, with polar coordinates, of the sky above a GNSS receiver. Thus, in FIG. 3A, the line 305 that is the circumference of the circular plane 300 represents the horizon, and the point 310 at the center of circular plane 300 is the zenith, the point directly overhead in the sky. From the horizon 305 to the zenith 310 is from 0° altitude to 90° altitude. SVs 321, 323, 325, 327, and 329 are represented by X's in FIG. 3A. FIG. 3A also has visibility mask, which is represented by a dotted circular line 330. Mask 330 has an angle of about 10°, which means everything below 10° above the horizon 305 is blocked. SV's in an area blocked by a visibility mask are neither acquired nor tracked. Thus, SV 329 would not be acquired/tracked by a GNSS receiver having sky 300 above and visibility mask 330 as shown in FIG. 3A.

Figure 3B:
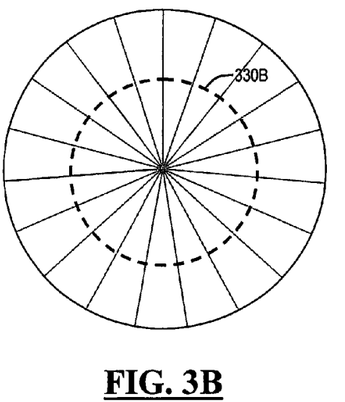

Mask information provided to mobile terminal 200 by one or more Mask Databases according to embodiments of the present invention may include mask angles or other mask dimensions and/or preset masks. For example, mask information provided by an embodiment of the present invention may simply be an increased mask angle. In other words, the standard mask angle is 10° as shown in FIG. 3A, but based on acquisition/tracking and/or other data, a system according to an embodiment of the present invention determines that a mask 330B as shown in FIG. 3B having an angle of around 35° is more appropriate for mobile terminal 200's current location and/or course of travel. Using such a mask, the GNSS components in mobile terminal 200 will not attempt to acquire/track any SV below 35°, as shown by the dotted line 330B in FIG. 3B.

Figure 3C:
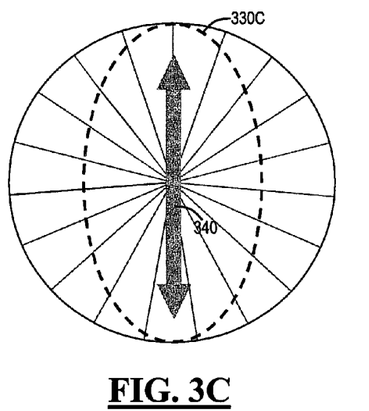

Mask information provided to mobile terminal 200 by the Mask Database(s) according to an embodiment of the present invention may indicate the shape of the visibility mask in terms of mobile terminal 200's present course of travel. For example, if mobile terminal 200 is proceeding along a course of travel having a direction 340 (i.e., trajectory 340) as indicated in FIG. 3C, the mask information provided by the Mask Database(s) may indicate that mask 330C should be used. Mask 330C may be appropriate where the user of mobile terminal 200 is walking down a city street, and the sky is mostly blocked on both sides, but viewable both in front and in back of the user (regardless of which direction the user is traveling, i.e., whether up or down the street).

Figure 3D:
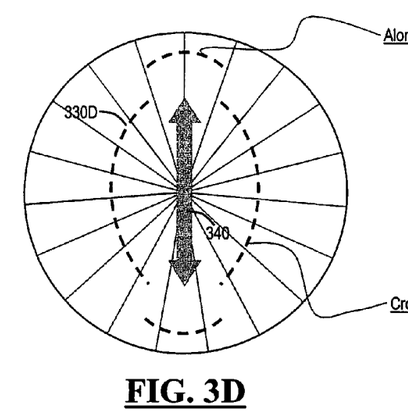

FIG. 3D illustrates one way of dealing with areas in the sky that are along-track, i.e., along the direction of motion 340, or cross-track, i.e., orthogonal to the direction of motion 340 (i.e., trajectory 340). In FIG. 3D, the visibility mask 330D has different elevations based on whether the region of sky is along-track or cross-track.

Figure 3E:
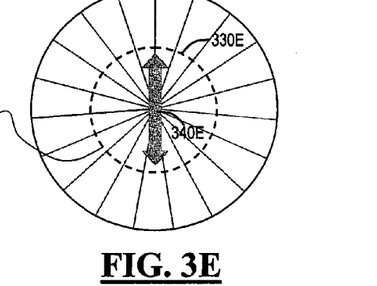
Figure 3F:
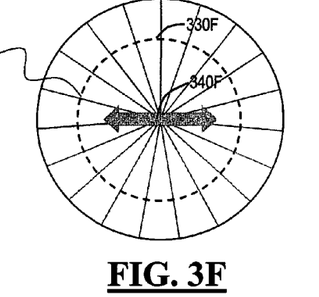

FIGS. 3E and 3F illustrate another way of dealing with visibility masks, where the mask angle changes based on the user's trajectory/direction of motion (when located in roughly the same area), according to an embodiment of the present invention. Thus, if the GNSS receiver detects direction of motion 340E while in a specific area, the system according to this embodiment of the present invention will provide visibility mask 330E (or, more accurately, the mask angle corresponding to mask 330E). If, on the other hand, the GNSS receiver detects direction of motion 340F while in the same specific area, the system according to this embodiment of the present invention will provide visibility mask 330F (or, more accurately, the mask angle corresponding to mask 330F). This embodiment is based on the approximation of what street the GNSS receiver is travelling on within, for example, a city's grid. In other words, without necessarily detecting the exact location of the GNSS receiver, the direction of motion of the GNSS receiver in a specific area will indicate what path/road the GNSS receiver is on. For example, if a GNSS receiver is in New York City in the area of Madison Avenue (which runs North-South) and 44$^{th}$ Street (which runs East-West) and is detected going North, a system according to an embodiment of the present invention would provide the appropriate mask information for one heading North on Madison Avenue.

In an embodiment using any of FIGS. 3C-3F, where there is different along-track and cross-track mask information in the mask database, a GNSS receiver can optimize its acquisition and tracking strategy and reduce its power consumption. When abrupt changes affecting signal availability are made (such as a turn from one city street to another), mask information specific to the new conditions (such as a new trajectory) may be provided and used by the GNSS receiver. Such mask information allows the GNSS receiver to determine the optimum time/location for, e.g., turning on and off acquisition and/or tracking channels for particular SVs.

Figure 4A:
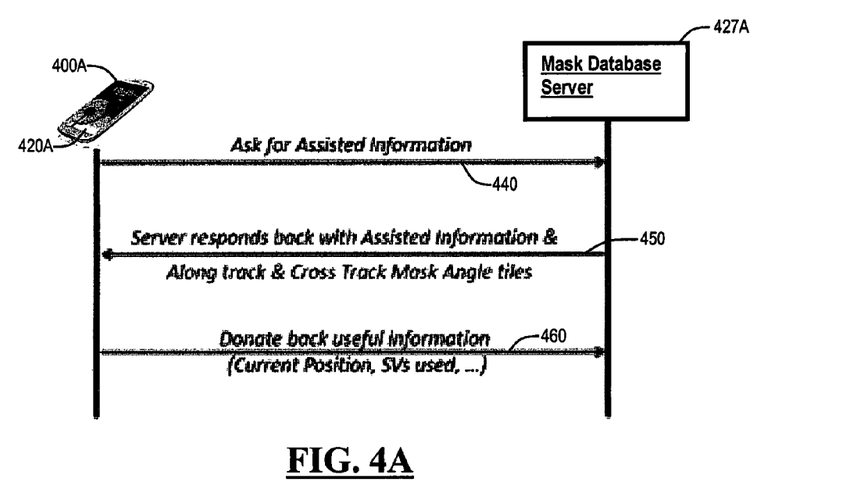
FIG. 4A is a flow diagram showing the information transfer between a Mask Database Client and a Mask Database Server according to an embodiment of the present invention.
Figure 4B:
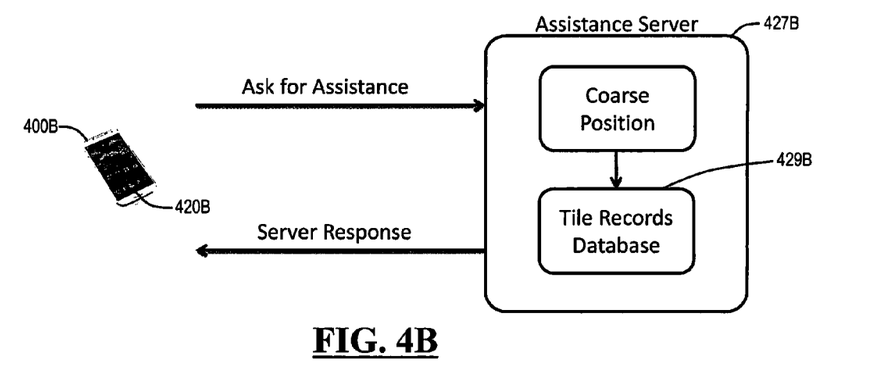
FIGS. 4B and 4C show two variations on the transfer of information between a Mask Database Client and a Mask Database Server according to embodiments of the present invention.
Figure 4C:
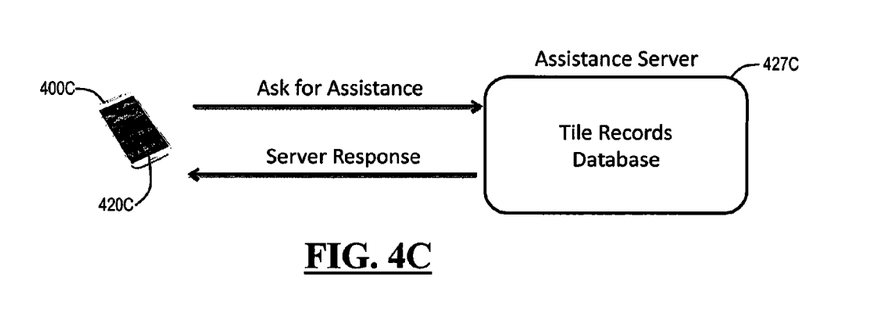
Figure 5:
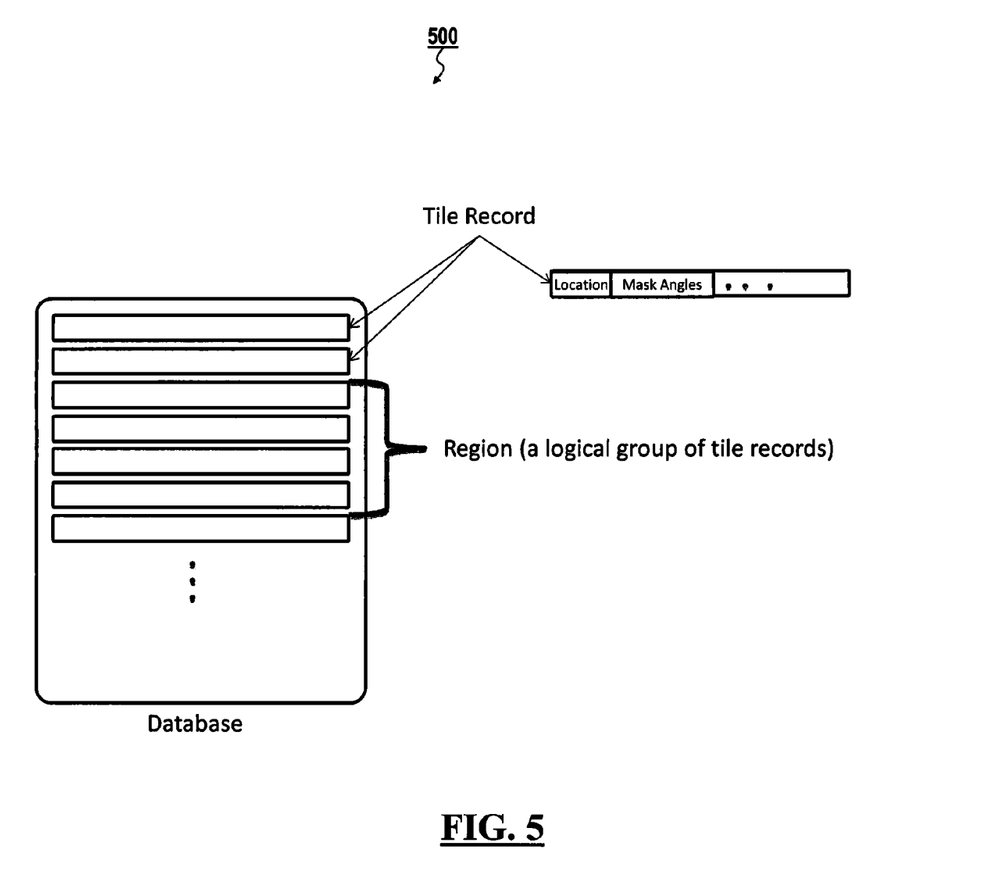
FIG. 5 shows the data structure of a Mask Database according to an embodiment of the present invention.

FIG. 4A is a flow diagram showing the information transfer between a Mask Database Client and a Mask Database Server according to an embodiment of the present invention, while FIGS. 4B and 4C show two variations on the transfer of information between a Mask Database Client and a Mask Database Server according to embodiments of the present invention. FIG. 5 shows the data structure of a Mask Database according to an embodiment of the present invention.

In FIG. 4A, Mask Database Client 420A is running on cell phone 400A, while Mask Database Server 427A is connected to the Mask Database Client 420A through a mobile telecommunications system and possibly one or more networks. In step 440, Mask Database Client 420A asks for assisted information from Mask Database Server 427A, where the assisted information includes at least mask information regarding cell phone 400A's current location and/or present course of travel in a specific region in a specific direction (i.e., trajectory). This embodiment may be implemented in an augmented GNSS system, where a system for providing such assisted information is already in place. In step 450, Mask Database Server 427A responds back with the assisted information including mask information. As discussed below in reference to FIG. 5, the provided mask information in this embodiment of the present invention is in the form of data from a tile record, including along-track and cross-track mask angles. In step 460, Mask Database Client 420A donates back useful information to be stored in Mask Database Server 427A.

There are various types of information that may be transferred between the Mask Database Client and the Mask Database Server, as would be understood by one of ordinary skill in the art. For example, as shown in FIG. 4B, the Mask Database Client 420B (in this case, in Mobile Terminal 400B) has determined its coarse position and provides this along with an assistance request to an Assistance Server 427B (acting as the Mask Database Server in this embodiment). The Assistance Server 427B uses that course position information to find the appropriate tile record from the Tile Records Database 429B, and then sends a response to the Mobile Terminal 400B including information from the retrieved tile record. As another example, as shown in FIG. 4C, after receiving the assistance request, the Assistance Server 427C itself determines the coarse position of Mobile Terminal 400C using other information, such as the cellular id of Mobile Terminal 400C or WiFi positioning information.

FIG. 5 shows the data structure of a Mask Database according to an embodiment of the present invention. Mask Database 500 contains a plurality of tile records, which are grouped into regions. Each tile is a bounded geographic area, and a tile record contains information associated with that tile, including mask information (such as, e.g., along-track and cross-track mask angles for that tile). A region is a collection of tile records relevant to a geographic area and, in this embodiment, a map is a collection of regions relevant to a large geographic area. While "cross-track" and "along-track" are defined only in relation to the motion of the mobile terminal, any trajectory-based mask angle data stored in the tile records of Mask Database 500 must be associated with an absolute reference grid. Thus, for example, a tile record in Mask Database 500 may have East→West trajectory mask angle data and North→South trajectory mask angle data. When a Mask Database Client sends information indicated that the mobile terminal it is embodied in is moving from East to West in a given tile, the Mask Database Server would retrieve the appropriate tile record from Mask Database 500 and send the Mask Database Client the East→West trajectory mask angle data as along-track mask information and the North→South trajectory mask angle data as cross-track mask information. In other embodiments, each tile record may have many more gradations of possible trajectories (i.e., many more compass points than just the ordinal North, South, East, and West) or the Mask Database Server could possibly interpolate more specific trajectory data for a mobile terminal from whatever trajectory data is stored in the appropriate tile record.

Figure 6:
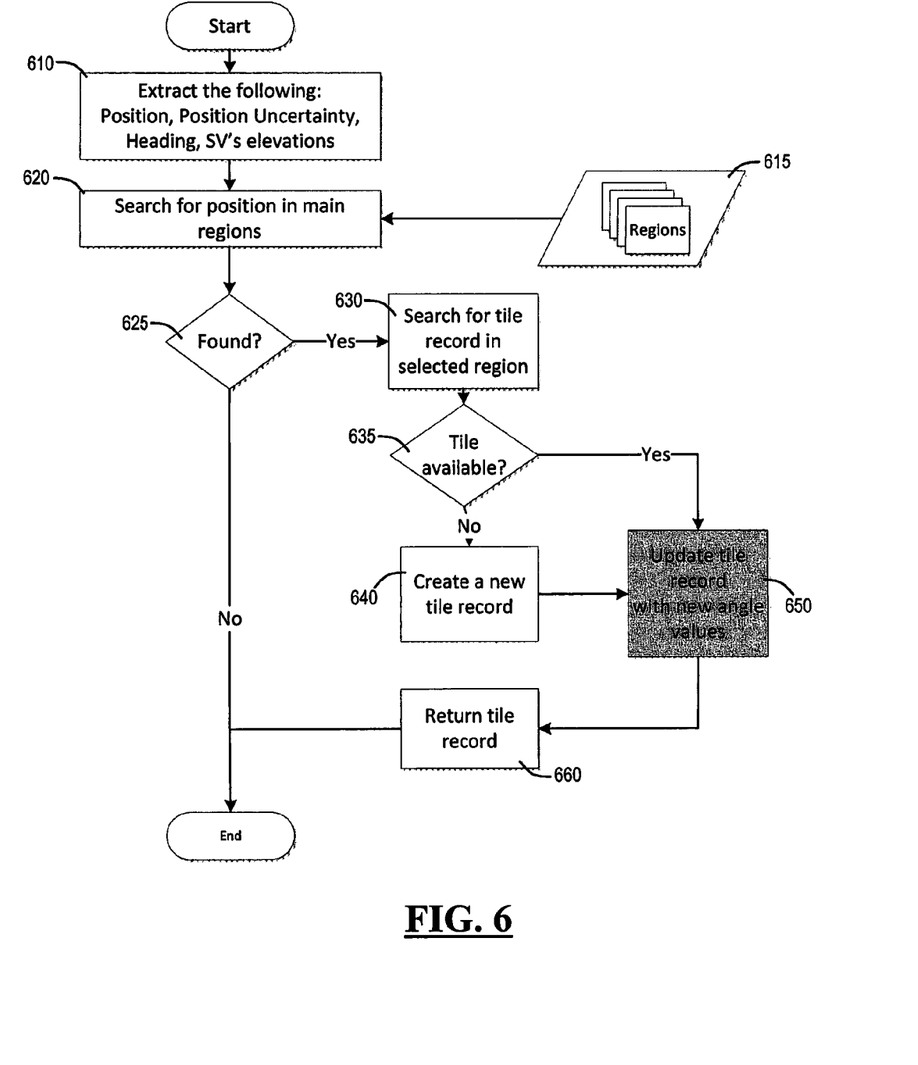
FIG. 6 is a flowchart illustrating a method for searching for and/or updating mask information, according to an embodiment of the present invention.

FIG. 6 is a flowchart illustrating a method for searching for and/or updating mask information, according to an embodiment of the present invention. In step 610, current information regarding the GNSS receiver is extracted, such as, e.g., position, position uncertainty, heading/trajectory, SV elevations, etc. Based on that information, a region corresponding to the GNSS receiver's position is searched for in step 620, from a database of regions 615. In step 625, it is determined whether a matching region has been found. If there is, in step 630, the specific tile record corresponding to the GNSS receiver's position is searched for within the matching region found in step 620. In this embodiment, the regions are preset selections of tile records corresponding to preselected geographic areas which are suitable for such grouping.

In step 635, it is determined whether the tile record exists for the GNSS receiver's position in the found region. If such a tile record does not exist, a new tile record is created in step 640. After either the new tile is created in step 640 or the tile record does exist in step 635, the tile record is updated with new mask information, such as new mask angle values, in step 650. More details concerning update step 650 are provided below with reference to FIG. 7. After update step 650, the tile record is returned in step 660, and the mask information (such, as, e.g., one or more mask angles) for that tile is sent to the Mask Database Client. After that, or if it is determined in step 625 that no region was found in the database in step 620, the method ends.

Figure 7:
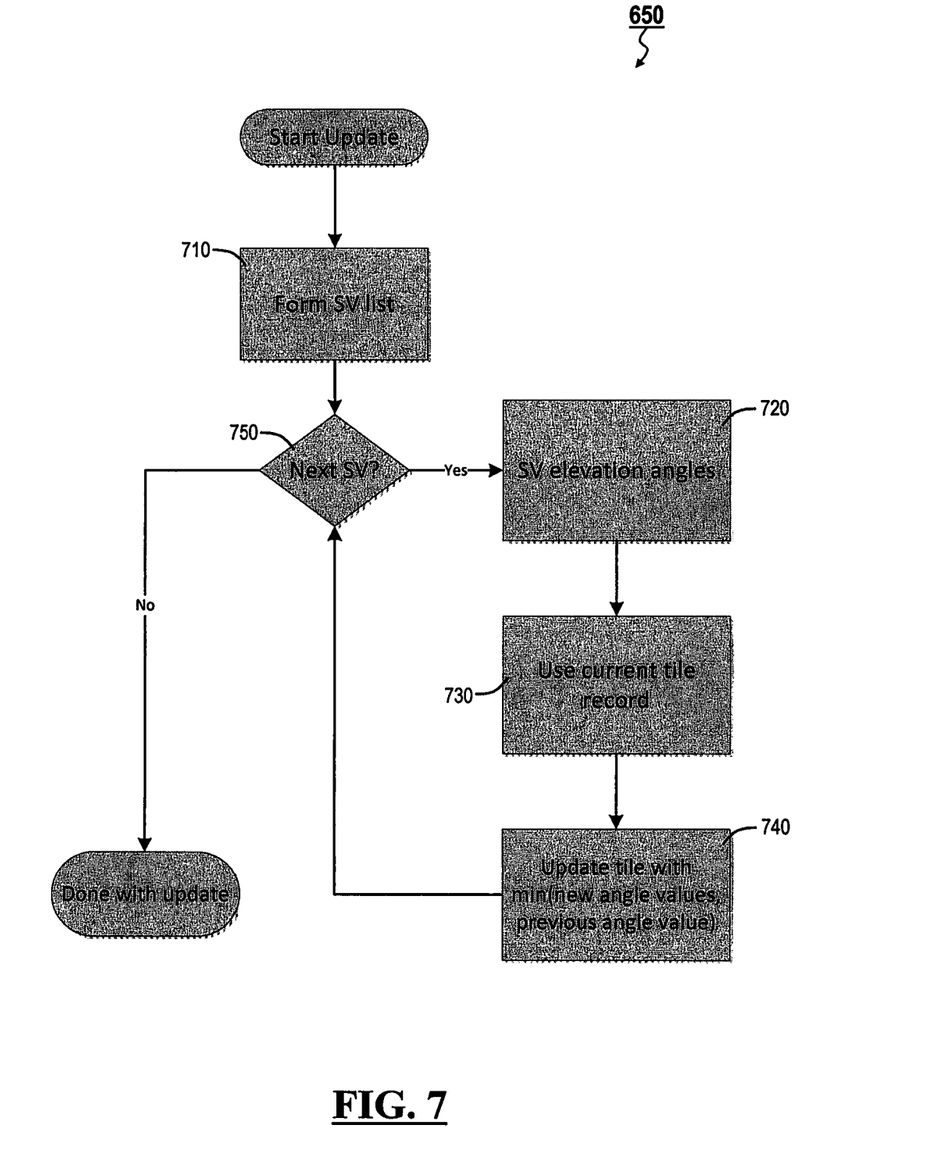
FIG. 7 is a flowchart illustrating a method for performing step 650 in FIG. 6, i.e., to update mask information, according to an embodiment of the present invention.

FIG. 7 is a flowchart illustrating a method for performing step 650 in FIG. 6, i.e., to update mask information, according to an embodiment of the present invention. In step 710, the method starts with the list of SV's that are currently being tracked is formed. In step 720, the line of sight angles (elevation and azimuth) associated with each SV are provided by the Mask Database Client to the Mask Database. Using the tile record that includes the GNSS receiver's current position in step 730, the Mask Database Server evaluates whether the newly received line of sight angles are of a lower elevation than previously stored line of sight angles within an incremental azimuth range. An incremental azimuth range is an azimuth bin, which can be understood as a sector, wedge, or other unit of space within the azimuth plane, such as are shown in FIGS. 3A-3F. If the newly received line of sight angles are of lower elevation, the elevation angle for the incremental azimuth range is updated with the newly provided elevation angle in step 740. The process then repeats for each SV for which newly provided line of sight data is available (step 750) until all line of sight data has been processed ("Done with update").

While several embodiments have been described, it will be understood that various modifications can be made without departing from the scope of the present invention. Thus, it will be apparent to those of ordinary skill in the art that the invention is not limited to the embodiments described, but can encompass everything covered by the appended claims and their equivalents.

What is claimed is:

1. A method for a portable device capable of receiving satellite navigational system signals to receive visibility mask information, comprising:
   retrieving mask information corresponding to a current location of the portable device;
   setting a visibility mask based on the retrieved mask information corresponding to the current location of the portable device; and
   performing acquisition and tracking of the satellite navigational system signals only in portions of the sky indicated as unblocked by the visibility mask.

2. The method of claim 1, wherein the mask information also corresponds to a trajectory of the portable device.

3. The method of claim 1, wherein retrieving mask information comprises:
   transmitting a request to a mask database server, the request comprising information indicating the current location of the portable device; and
   receiving, in response, the mask information from the mask database server.

4. The method of claim 1, further comprising:
   transmitting, by the portable device, acquisition and tracking information corresponding to a current location of the portable device to a mask database server.

5. The method of claim 4, wherein transmitting comprises:
   transmitting, by the portable device, acquisition and tracking information corresponding to at least one of a current location and a trajectory of the portable device to the mask database server.

6. The method of claim 4, wherein the mask database server is configured to store the transmitted acquisition and tracking information according to the corresponding location.

7. The method of claim 1, wherein mask information comprises a mask angle.

8. A portable device, comprising:
   a receiver which receives at least satellite navigational system signals;
   one or more processors; and
   at least one non-transitory computer-readable medium having program instructions stored therein, wherein the program instructions, when executed, have the one or more processors perform the steps of:
   retrieving mask information corresponding to a current location of the portable device;
   setting a visibility mask for the satellite navigational system signals based on the retrieved mask information corresponding to the current location of the portable device; and
   performing acquisition and tracking of the satellite navigational system signals only in portions of the sky indicated as unblocked by the visibility mask.

9. A mobile terminal, comprising:
   a receiver which receives at least satellite navigational system signals;
   a mobile telecommunication network transceiver which transmits and receives signals of a mobile telecommunications network;
   one or more processors; and
   at least one non-transitory computer-readable medium having program instructions stored therein, wherein the program instructions, when executed, have the one or more processors perform the steps of:
   transmitting a request for mask information via the mobile telecommunications network to a mask database server, the request comprising information indicating the current location of the mobile terminal;
   receiving, in response, the mask information from the mask database server;
   setting a visibility mask for the satellite navigational system signals based on the received mask information corresponding to the current location of the mobile terminal; and
   performing acquisition and tracking of the satellite navigational system signals only in portions of the sky indicated as unblocked by the visibility mask.

10. A mask database server, comprising:
    one or more processors; and
    at least one non-transitory computer-readable medium having program instructions stored therein, wherein the program instructions, when executed, have the one or more processors perform the steps of:
    receiving requests from portable devices regarding mask information corresponding to specific locations;
    retrieving mask information corresponding to the specific locations from one or more mask databases; and
    transmitting mask information corresponding to specific locations to the requesting portable devices,
    wherein the portable devices set a visibility mask for the satellite navigational system signals based on the transmitted mask information, and perform acquisition and tracking of the satellite navigational system signals only in portions of the sky indicated as unblocked by the visibility mask.

11. The mask database server of claim 10, wherein the program instructions further have the one or more processors perform the step of:
    receiving, from a portable device, acquisition and tracking information corresponding to a current location of the portable device.

12. The mask database server of claim 11, wherein the program instructions further have the one or more processors perform the step of:
    storing the transmitted acquisition and tracking information according to its corresponding location, wherein the acquisition and tracking information is used to generate mask information for the corresponding location.

13. The mask database server of claim 10, wherein the program instructions further have the one or more processors perform the step of:
storing mask information according to its corresponding tile, wherein each tile is an area within a region, and mask information is retrieved according to a tile corresponding to a current location of a portable device.

14. The mask database server of claim 13, wherein the program instructions further have the one or more processors perform the step of:
creating mask information to be stored according to a tile when there is no mask information presently stored corresponding to the tile and a request has been received from a portable device regarding mask information corresponding to the tile.

15. The mask database server of claim 14, wherein the mask information to be stored is created from information provided by the portable device which transmitted the request regarding mask information corresponding to the tile.

16. A system for providing mask information to portable devices capable of receiving satellite navigational system signals, comprising:
one or more mask database servers which store mask information according to a corresponding area;
a plurality of portable devices connected to at least one mobile telecommunication network, each of the plurality of portable devices capable of receiving and transmitting data to and from the one or more mask database servers via the at least one mobile telecommunication network, each of the plurality of portable devices comprising:
at least one non-transitory computer-readable medium having program instructions stored therein, wherein the program instructions, when executed, have the one or more processors perform the steps of:
transmitting a request for mask information via the mobile telecommunications network to at least one mask database server, the request comprising information indicating a current location of a portable device;
receiving, in response, mask information corresponding to an area comprising the current location from the at least one mask database server;
setting a visibility mask for the satellite navigational system signals based on the received mask information corresponding to the current location of the portable device; and
performing acquisition and tracking of the satellite navigational system signals only in portions of the sky indicated as unblocked by the visibility mask.

* * * * *